Sept. 13, 1927.                J. SCHERNER                1,642,561
                                BEAD RING
                            Filed Nov. 17, 1926
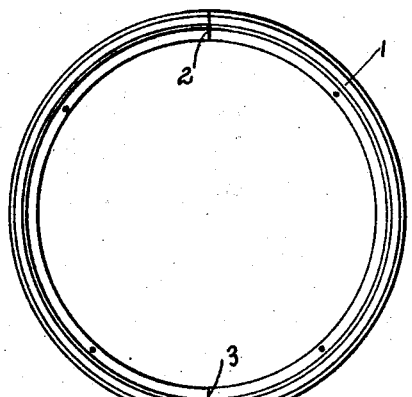
Fig.1
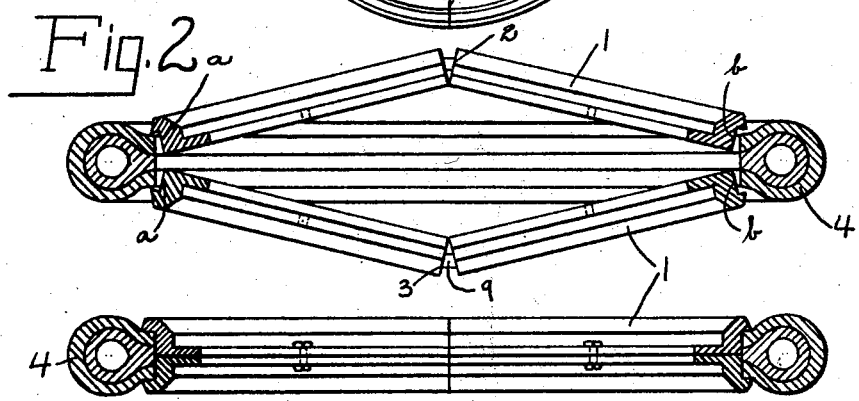
Fig.2
Fig.3
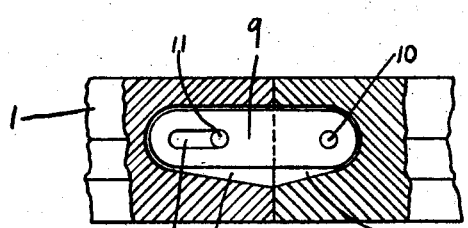
Fig.5
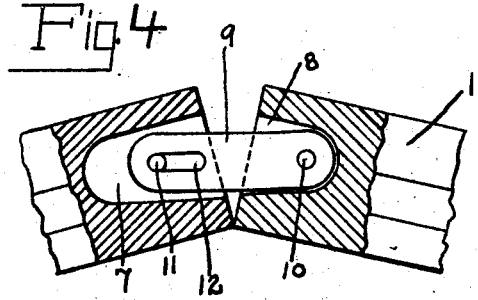
Fig.4
John Scherner
  Inventor
By
       Attorney Patented Sept. 13, 1927.

1,642,561

UNITED STATES PATENT OFFICE.

JOHN SCHERNER, OF MILWAUKEE, WISCONSIN, ASSIGNOR TO THE FISK RUBBER COMPANY, OF CHICOPEE FALLS, MASSACHUSETTS, A CORPORATION OF MASSACHUSETTS.

BEAD RING.

Application filed November 17, 1926. Serial No. 148,939.

My invention relates to an improvement in the bead rings generally used for shaping the bead portion of pneumatic tire cases when the latter are cured under internal expanding pressure.

These rings are of the desired cross-section and are applied one to each side of the tire and are bolted or otherwise fastened together to firmly hold the beads of the casing between the air bag and the bead cavities of the rings. Bead rings are usually applied to the casing in a hydraulic press, substantial pressure being required to force the rings home and hold them in position while the bolts or other fastening means are applied. It often happens that the operator has difficulty in getting the rings in proper position due to the nicety with which the rings fit, and substantial time may thus be lost in this operation. Where by means of conveyor systems the vulcanization and steps preparatory thereto are carried on as a continuous operation, loss of time in applying the bead rings may hold up other operations. It is the object of my invention to provide a bead ring which may be more easily and quickly placed in position and with a minimum of attention from the operator.

In the drawings which illustrate one embodiment of my invention

Figure 1 is a plan view of the bead ring of my invention,

Figure 2 is a diametrical sectional view showing the bead rings in position to be applied, Figure 3 is a similar sectional view showing the bead rings applied, and Figures 4 and 5 are details on an enlarged scale showing, respectively the hinge in open and closed position.

According to my invention I form the rings of any desired cross-sectional shape and hinge the ring at diametrical opposite points so as to break the ring out of its plane. Referring to the drawings 1 designates the bead rings hinged at the points 2 and 3 to assume a position diagrammatically shown in Figure 2. It will be understood that the degree of distortion is greatly exaggerated in the drawings for clearness of illustration and that in practice the ring is only slightly bent from its plane. This slight distortion is only sufficient to assure that the points "$a$" and "$b$" of the rings are within the inner edges of the bead of the tire casing 4. As the rings are forced back into their plane points "$a$" and "$b$" positively engage the bead and the remainder of the circumference of the rings is progressively brought into proper position, with the result that the rings are applied with a sureness and speed unattainable with the conventional solid ring.

The halves of the ring may be hinged in any suitable manner but it is highly desirable that the faces of the ring adjacent the bead shall present a smooth surface when the ring is in position. In Figures 4 and 5 I have illustrated a form of hinge which meets this requirement. I form recesses 7 and 8 in the ends of the ring halves in which is positioned a connecting link 9. This link is pivotally connected as at 10 to one ring half and is connected to the other by a pin 11, secured to the ring, slidable in a slot 12 in the link 9. The recesses 7 and 8 are formed to permit the pivotal and sliding movement of the link and the operation will be obvious from figures 4 and 5.

I claim:

1. A bead ring for use in the curing of pneumatic tire casings comprising a ring, of suitable cross-section, hinged at diametrically opposite points.

2. A bead ring for use in curing of pneumatic tire casings comprising a ring of suitable cross-section hinged at diametrically opposite points to permit sufficient distortion of the ring to bring two points of the bead engaging surfaces of the ring positively within the inner periphery of the bead of the tire casing to which it is applied.

3. A bead ring for use in the curing of pneumatic tire casings comprising a ring, of suitable cross-section, hinged at diametrically opposite points, the hinges adapted, when closed, to present a substantially smooth surface to the bead portion of the tire casing.

4. A bead ring for use in the curing of pneumatic tire casings comprising a ring of suitable cross-section hinged at diametrically opposite points to permit sufficient distortion of the ring to bring two points of the bead engaging surfaces of the ring positively within the inner periphery of the bead of the tire casing to which it is applied, the hinges adapted, when closed, to present a substantially smooth surface to the bead portion of the casing.

In testimony whereof I have signed my name to the above specification.

JOHN SCHERNER.